(No Model.)

E. P. WALLING.
COFFEE ROASTER.

No. 246,252. Patented Aug. 23, 1881.

WITNESSES.
W. A. Bertram

INVENTOR
E. P. Walling
BY

ATTORNEY.

UNITED STATES PATENT OFFICE.

EDMUND P. WALLING, OF WHITNEY, TEXAS.

COFFEE-ROASTER.

SPECIFICATION forming part of Letters Patent No. 246,252, dated August 23, 1881.

Application filed April 22, 1881. (No model.)

*To all whom it may concern:*

Be it known that I, EDMUND PENDLETON WALLING, of Whitney, Hill county, State of Texas, have invented certain new and useful Improvements in Coffee-Roasters; and I hereby declare the same to be fully, clearly, and exactly described as follows, reference being had to the accompanying drawings, in which—

Figure 1:
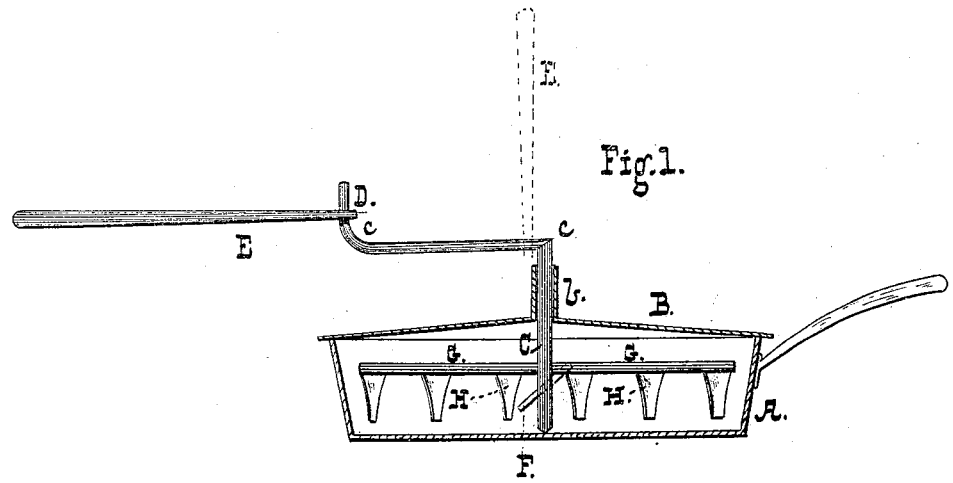
Figure 2:
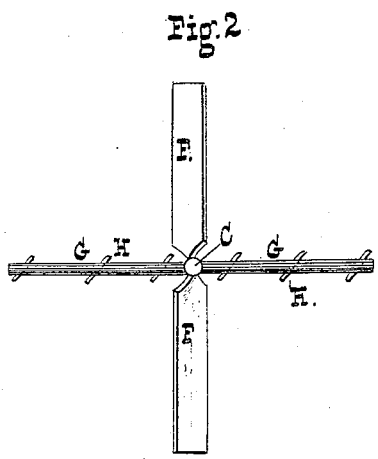

Figure 1 is a side elevation of the device, and Fig. 2 a plan of the stirrer.

My invention has for its object to provide a culinary utensil primarily intended for use as a coffee-roaster, but also adapted for use in connection with an ordinary skillet in the cooking of any article which needs to be stirred while upon the fire.

In roasting coffee it is desirable that the beans be thoroughly stirred, not shaken nor tossed about, as in the revolving roasters, during the process of roasting, and, for obvious reasons, the operation should be conducted in a closed vessel so arranged that it may be conveniently opened to inspect the beans from time to time. To this end I provide a lid adapted to fit over the standard sizes of skillet and fit it with a central sleeve, in which turns a shaft having a number of stirrers. The end of the shaft is bent to form a crank, and on the crank I mount a pitman, by means of which the crank is turned.

In the drawings, A is an ordinary skillet, and B the cover, having a sleeve, b, cast or formed integral therewith or attached thereto. Through the sleeve passes a shaft, C, bent at c to form a crank, D, and to the crank is pivoted a pitman, E, by preference of wood or other suitable non-conductor of heat. Below the lid or cover B two inclined blades, F, are attached to the shaft C, and intermediate these blades are two horizontal shafts, G, having a number of depending inclined stirrers, H, the lower ends of which extend below the edges of the blades F.

In operation, the skillet is supplied with the coffee, peanuts, or whatever is to be roasted or cooked, and the lid is placed over the skillet. On turning the crank by means of the pitman the revolving blades F lift and stir the coffee superficially, as it were, while the stirrers H following them agitate and thoroughly mix the mass. The peculiar curvature of the blades and stirrers is such that while the tendency of the blades is to throw the beans tangentially—*i. e.*, away from the shaft—the stirrers tend to bring it toward the center, maintaining a constant level in the skillet. The pitman enables the operator to stand at a convenient distance from the fire, and subserves another important end. When it is desired to inspect the progress of the roasting the pitman is simply slipped along the shaft until it meets the vertical portion, as shown in dotted lines, when it answers as a handle to lift the entire system of stirrers and lid from the skillet.

What I claim is—

1. In combination with the lid and horizontal inclined blades, the vertical inclined stirrers, arranged as described, whereby the tangential thrust of the blades is neutralized, as set forth.

2. In combination with the lid and vertically and horizontally inclined stirrers F H, the crank-shaft and the pitman mounted thereon, and adapted, as described, to be slid toward the shaft to lift the lid and stirrers, as set forth.

EDMUND P. WALLING.

Witnesses:
T. C. SPENCER, Sr.,
R. B. SPENCER.